United States Patent [19]

Haven

[11] 4,356,812
[45] Nov. 2, 1982

[54] DIRECTIONAL SOLAR HEATING ASSEMBLY

[76] Inventor: Robert M. Haven, 204 E. Emma, Lafayette, Colo. 80026

[21] Appl. No.: 340,998

[22] Filed: Jan. 20, 1982

[51] Int. Cl.$^3$ .............................................. F24J 3/02
[52] U.S. Cl. .................................... 126/438; 126/419; 126/443; 126/422; 126/425; 126/428; 126/435
[58] Field of Search ............... 126/438, 439, 420, 443, 126/418, 419, 422, 423, 424, 425, 428, 429, 435, 437, DIG. 1; 136/246, 251

[56] References Cited

U.S. PATENT DOCUMENTS

| 229,109 | 6/1880 | Ely | 126/439 X |
|---|---|---|---|
| 528,255 | 10/1894 | Monks et al. | |
| 4,022,188 | 5/1977 | Cohen et al. | 126/271 |
| 4,088,116 | 5/1978 | Pastor | 126/270 |
| 4,192,291 | 3/1980 | Arent | 126/439 |

*Primary Examiner*—Samuel Scott
*Assistant Examiner*—Randall L. Green
*Attorney, Agent, or Firm*—Lane, Aitken, Kice & Kananen

[57] ABSTRACT

A solar heating assembly includes a fluid receiver movable between a thermally insulated compartment and a transparent enclosure for exposure to the rays of the sun. The transparent enclosure is adjacent the reflecting surface of a reflector for focusing the rays of the sun on the fluid receiver. An insulated door is pivotally connected to the thermally insulated compartment and is movable between a position permitting communication between the thermally insulated compartment and the transparent enclosure and a position thermally sealing the insulated compartment. The receiver engages the insulated door for pivoting the door open as the receiver moves from the insulated compartment to the transparent enclosure, and a cable guided by a series of pulleys connects the receiver to the door for closing the door as the receiver moves from the transparent enclosure to the insulated compartment. A thermally actuated detent member retains the receiver in the transparent enclosure unless the ambient temperature falls below a predetermined level. A tilting mechanism tilts the reflector about a horizontal axis to follow the rise and fall of the sun, and a turntable for rotating the receiver and reflector follows the travel of the sun across the sky and cooperates with the tilting mechanism in tilting the reflector. A season adjustment mechanism is associated with the tilting mechanism to provide different degrees of tilting for different seasons.

21 Claims, 8 Drawing Figures

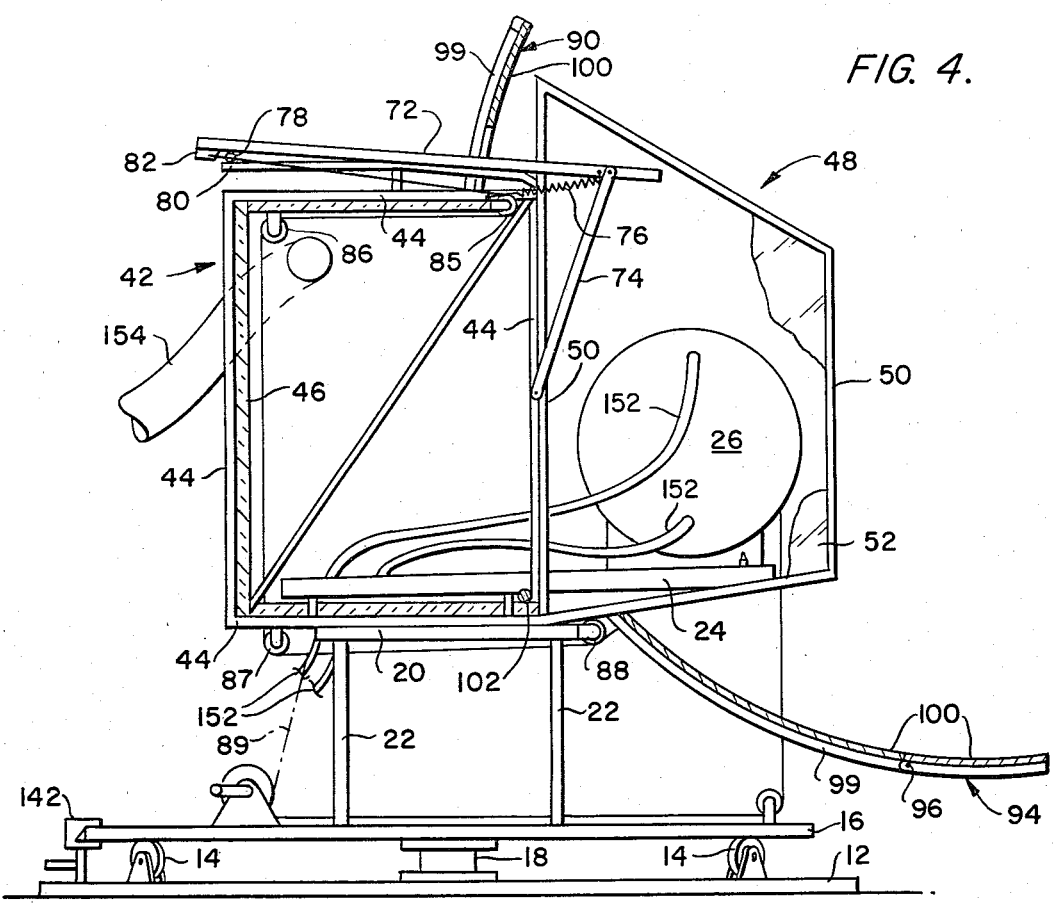
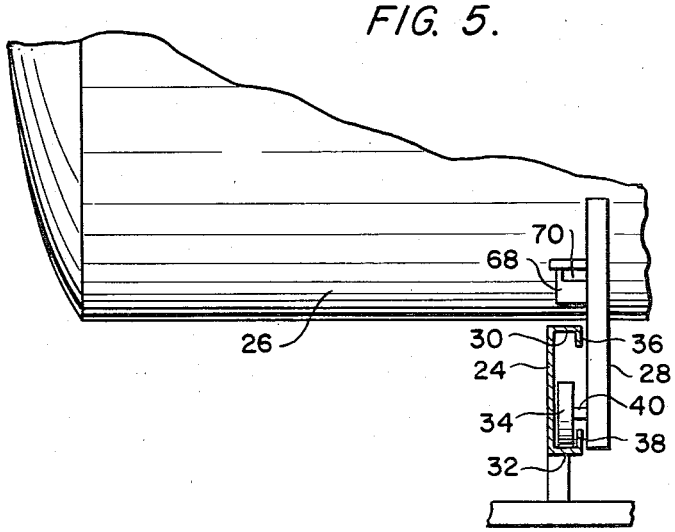

DIRECTIONAL SOLAR HEATING ASSEMBLY

BACKGROUND OF THE INVENTION

An ample supply of hot water has long been an indispensable need for residential and commercial uses. Since the cost of energy has risen dramatically in recent years, it has become increasingly desirable to find an economical but effective way of heating water.

Various devices have been proposed to fill the need for supplying economical hot water. However, these devices have had shortcomings of one type or another. For example, some devices continue to use fossil fuels, electricity, or other forms of energy which are relatively expensive and which continue to increase in cost. Furthermore, such forms of energy require some sort of transmission lines or other type of transportation to convey them to the point of use. In other devices, which employ free energy such as solar energy, the devices have either been ineffective to supply the necessary heat to the water or other fluids to be heated, or have been so large, complex or costly as to make their use impractical. Still other devices fail to provide a system for retaining the heat once it has been collected or fail to provide their components with adequate protection from the elements, especially from freezing weather.

SUMMARY OF THE INVENTION

It is, therefore, an object of the present invention to provide a solar heating assembly which is relatively simple and inexpensive to produce, but which is effective in maximizing the energy of the sun to heat water or some other heat transfer medium.

It is another object of the present invention to provide a solar heating assembly which tracks the movement of the sun in order to collect the most intense available solar energy at all times of the day and in all seasons.

It is still another object of the present invention to provide a solar heating assembly having a thermally insulated compartment to retain, in a heat transfer medium, the heat collected from the sun.

It is yet another object of the present invention to provide a solar heating assembly having a mechanism to protect from freezing the portions of the assembly carrying water or other heat transfer medium.

Toward the fulfillment of these and other objects, the solar heating assembly according to the present invention comprises a solar collector including a heat transfer fluid receiver or tank movable between a transparent enclosure through which the rays of the sun are collected to heat the fluid and a thermally insulated compartment in which the heat of the fluid is retained during periods when solar energy is not being collected. A parabolic reflector is pivotally mounted with respect to the transparent enclosure about a horizontal shaft, curving around the transparent enclosure so that the transparent enclosure is in the focal area of the reflector. The receiver is mounted on rollers which move along inclined rails between the insulated compartment and the transparent enclosure. A cable is connected to the receiver and wound around a winch to pull the receiver toward the transparent enclosure. An insulated door, which separates the insulated compartment from the transparent enclosure, is contacted by the receiver as the receiver moves from the insulated compartment to the transparent enclosure, thereby pivoting the door up and out of the way and establishing communication between the insulated compartment and the transparent enclosure.

A thermally actuated release retains the receiver in the transparent enclosure and permits the receiver to roll down the inclined rails from the transparent enclosure to the insulated compartment in response to the temperature of the ambient air falling below a predetermined value. In addition, the solar collector is rotatably mounted on a base in order to follow the travel of the sun across the sky, and a tilting mechanism tilts the reflector up and down about the horizontal shaft in response to the rotation of the solar collector on the base, so that the reflector follows the rise and fall of the sun with respect to the horizon. The tilting mechanism includes a season adjustment to provide different degrees of tilt to account for the different paths taken by the sun in different seasons.

BRIEF DESCRIPTION OF THE DRAWINGS

FIG. 4 is a cross-sectional view similar to FIG. 2, but showing the receiver in the transparent enclosure;

FIG. 5 is an enlarged front elevation of a portion of the receiver, showing the cooperation between the receiver support and the rail;

FIG. 6 is an enlarged cross section of one of the rails, showing the temperature-responsive release mechanism;

DETAILED DESCRIPTION OF THE PREFERRED EMBODIMENT

Figure 1:
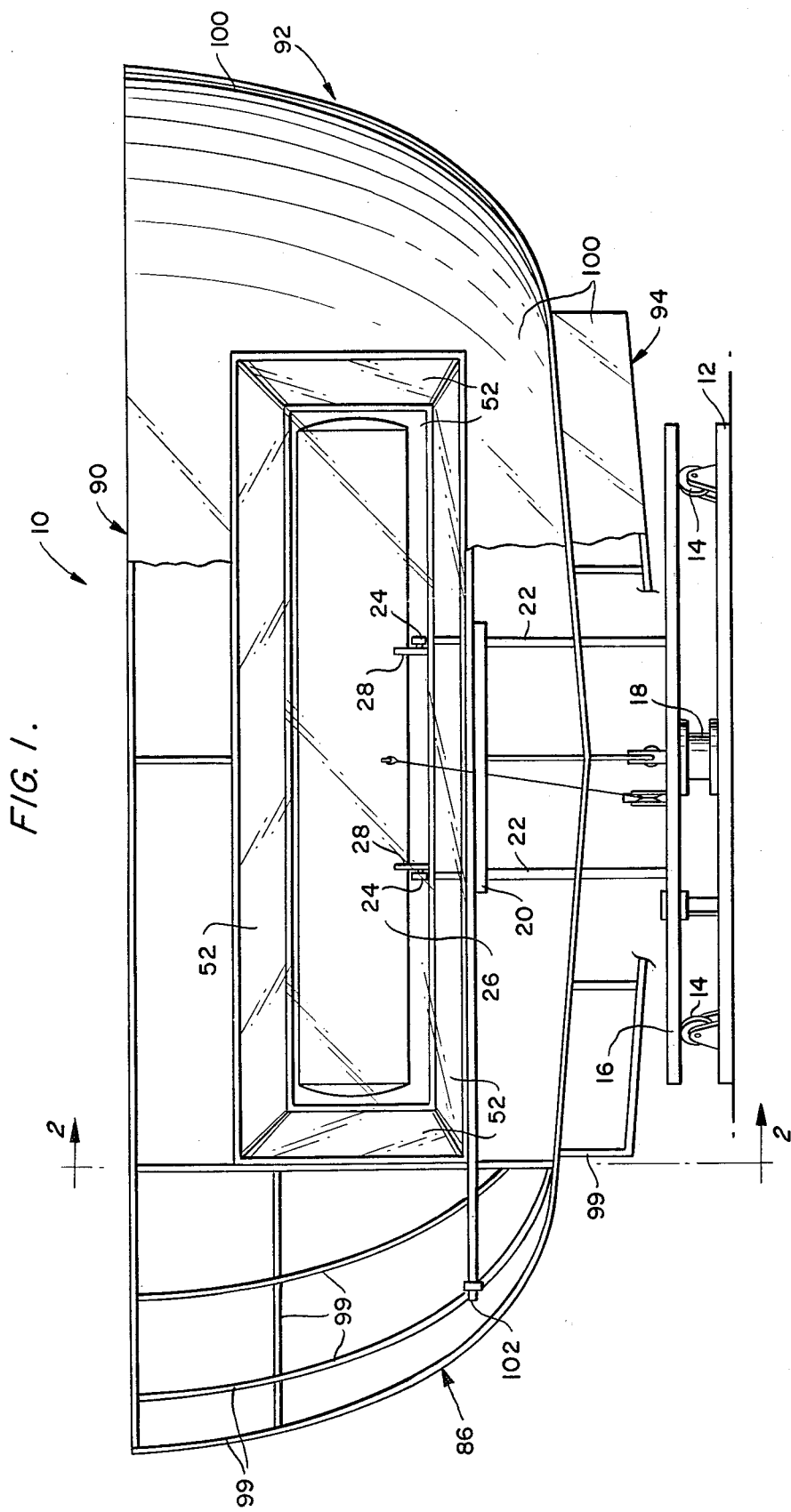
FIG. 1 is a front elevational view of the solar collector assembly according to the present invention, cut away on one side to show the frame.

As is illustrated in FIG. 1, the solar heating assembly according to the present invention, which is generally designated by the reference numeral 10, includes a base 12 having a plurality of rollers 14 mounted on an upper surface in a circular pattern to engage and support a lower surface of a turntable 16 which is rotatably connected to the base 12 by a shaft 18. A platform 20 is supported above the turntable 16 by legs 22 which are connected to the platform and affixed to the turntable. A pair of channel members serving as rails 24 are mounted in parallel on the platform 20 and extend beyond the platform 20 in the front and the rear. The rails 24 are inclined downward from front to rear for reasons to be described hereinafter.

A fluid receiving tank or receiver 26 for holding a heat transfer medium such as water is positioned across the rails 24 and is supported for rolling along the rails. The fluid receiver 26 has supports which include a pair of U-shaped cradle members 28 welded or otherwise suitably secured to the underside of the fluid receiver 26. As is best illustrated in FIG. 5, in which the left rail 24 is shown, the channels which are defined by the rails 24 face one another and have upper and lower flanges 30 and 32, respectively, the lower flanges 32 defining surfaces on which rollers 34 mounted on the U-shaped members cradle 28 may travel. A short vertical flange 36 depends from the upper flange 30 and another short vertical flange 38 extends up from the lower flange 32 to define a slot extending the length of the rail 24. The rollers 34 are mounted on stub shafts 40 extending from the outer sides of the U-shaped cradle members 28, so that the rollers 34 are received in the channels defined by the rails 24, and the stub shafts 40 are accommodated by the slots between the vertical flanges 36 and 38. Since the rails 24 are inclined, the fluid receiver 26 will roll to the lower ends of the rails.

Figure 2:
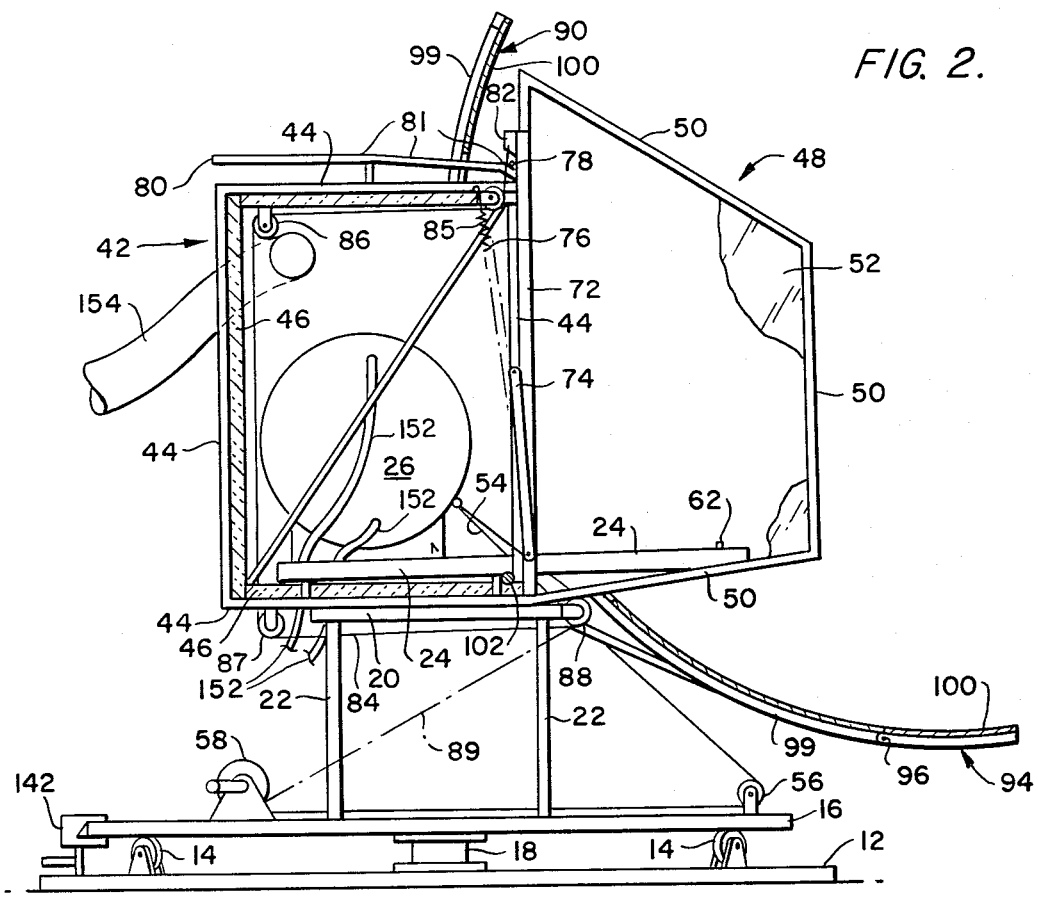
FIG. 2 is a cross-sectional view of the solar collector assembly, taken along line 2—2 in FIG. 1, showing the receiver in the insulated compartment.
Figure 3:
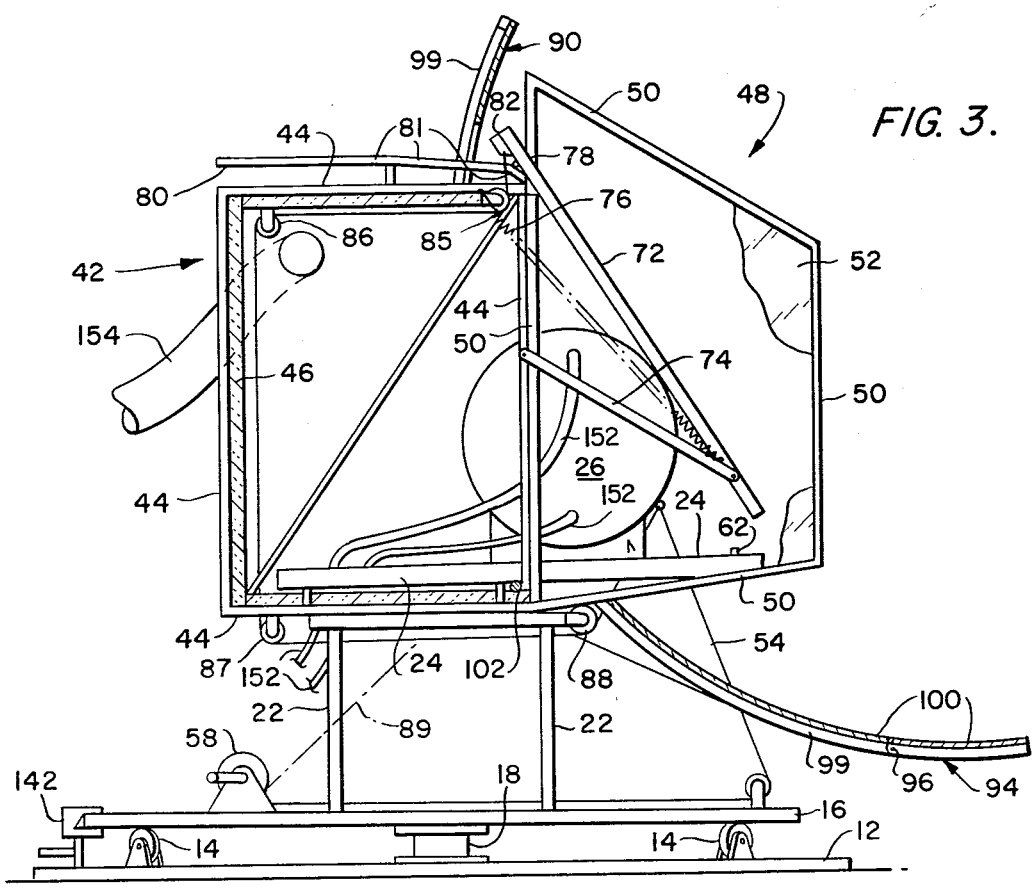
FIG. 3 is a cross-sectional view similar to FIG. 2, but showing the receiver between the insulated compartment and the transparent enclosure.

As is illustrated in FIGS. 2-4, a thermally insulated compartment 42 comprising a frame of lightweight structural members 44 and panels 46 of thermal insulation is mounted on a rear portion of the platform 20, from which it extends beyond the platform 20 and beyond the lower ends of the rails 24. The structural members 44 can be tubular aluminum or other lightweight structural material, and the panels 46 can include any suitable thermal insulation, such as fiberglass.

A transparent enclosure 48 is mounted on a forward portion of the platform 20 in communication with the insulated compartment 42, extending beyond the front and sides of the platform 20 and beyond the upper ends of the rails 24. The transparent enclosure 48 includes a frame of tubular aluminum or other lightweight members 50 and panels 52 of glass or other transparent material. Since the insulated compartment 42 and the transparent enclosure 48 are in communication, the fluid receiver 26 can roll from the insulated compartment 42 to the transparent enclosure 48. In order to move the fluid receiver 26 up the rails 24 from the insulated compartment 42 to the transparent enclosure 48, a cable 54 is attached to the fluid receiver 26 or to one of the U-shaped cradle members 28, from which it extends forward and downward around a pulley 56 mounted near the forward periphery of the turntable 16. The cable 54 is then wound around a winch 58 which is also mounted on the turntable 16. The winch 58 may be power driven or may include a hand crank for manual operation.

A thermally actuated release mechanism 60, as is shown in FIG. 6, comprises a catch or detent member 62 extending from an upper portion of one of the rails 24 to protrude through an aperture 64 formed in the upper flange 30. The catch or detent member 62 is mounted on the top of a thermally responsive bellows 66, mounted within the rail 24, which expands with increasing temperature and contracts with decreasing temperature. In normal ambient operating temperatures, the detent member 62 engages a tab 68 pivotally mounted on the adjacent cradle member 28. The tab 68 is capable of freely swinging to the rear, so that it can pass by the detent member 62 when the receiver 26 is moved into the transparent enclosure 48. However, a stationary member 70 affixed to the cradle member 28 just forward of the tab 68 prevents the tab 68 from pivoting forward past the vertical. Thus, in normal operating temperatures, the tab 68 engages the forward side of the detent member 62 and prevents the receiver 26 from rolling back down the rails 24, thereby retaining the receiver in the transparent enclosure 48.

The catch or detent member 62 remains in its protruding position, and, thus, retains the receiver 26 in the transparent enclosure 48 unless the temperature of the ambient air falls below a predetermined value. If this occurs, the thermally responsive bellows 66 contracts and moves the detent member 62 down and out of engagement the tab 68. As a result, the fluid receiver 26 rolls down the rails 24 into the insulated storage compartment 42, where it is protected from freezing.

As shown in FIG. 2, when the receiver 26 is in the insulated compartment 42, an insulated door or partition 72 is movable between a position in which it permits communication between the insulated storage compartment 42 and the transparent enclosure 48, and a position in which it separates the insulated storage compartment 42 from the transparent enclosure 48 and aids in thermally sealing the insulated compartment 42 from the ambient air. The door 72 is pivotally mounted by links 74 to generally vertical frame members 44 on the forward side of the insulated compartment 42. The links 74 have first ends pivotally mounted to the generally vertical frame members 44 and extend downwardly to a pivotal connection between their other ends and lower portions of the sides of the insulated door 72. Elongated spring devices 76, such as coil springs, one of which is shown, extend from an upper horizontal frame member 44 to a point of attachment near the pivotal attachment of the link 74 with the door 72. The door 72 includes a roller 78 mounted near each side, protruding rearwardly from a portion of a door 72 extending above the insulated compartment 42. A pair of tracks 80 are supported in parallel relationship on the top of the insulated compartment 42 in alignment with the rollers 78, the tracks 80 including a plurality of sections 81 which slope downwardly toward the front of the insulated compartment 42 at slightly increasing angles.

As is shown in FIG. 3, the door 72 is opened by engagement with the fluid receiver 26 as the receiver is pulled forward from the insulated compartment 42 to the transparent enclosure 48. The surface of the fluid receiver 26 engages the door 72 and causes it to move forward and upward by means of the pivoting of the links 74. As the pivoting motion takes place, the upper portion of the door 72 is supported on the tracks 80 by the rollers 78, which move along the tracks from front to rear. The elongated spring devices 76 are under tension when the door 72 is closed, and the tension increases as the door 72 pivots open until the spring devices 76 pass by the pivotal connection between the link 74 and the generally vertical structural member 44. After this point in the travel of the door 72, the spring devices 76 contract, pulling the door upward and rearward. A counterweight 82 mounted at the top of the door 72 aids in keeping the top of the door down on the tracks 80 as the lower portion of the door pivots upward.

The door 72 is automatically closed when the receiver 26 rolls into the insulated compartment 42 by a cable 84 which is secured at one end to the counterweight 82 or a region of the door 72 near the counterweight and at the other end to the receiver 26. The cable is guided by a plurality of pulleys 85, 86, 87 and 88 which are mounted on or near the insulated compartment 42. Thus, as the receiver 26 rolls down the rails 24 into the insulated compartment 42, it pulls the cable 84 around the pulleys 85-88, which in turn pulls the door 72 forward along the tracks 80 and down through the action of the links 74. The door 72 is then pulled tightly shut by the force of the spring devices 76.

As an alternative to the cable 54 wound around the pulley 56 to move the fluid receiver 26 into the transparent enclosure 48, the cable 54 and the pulley 56 can be eliminated in favor of a cable 89 connected to the cable 84 between the pulleys 87 and 88 and wound around the winch 58, as is shown by the broken lines in FIGS. 2–4. Although a pivoting door has been described, it is understood that other insulated doors or partitions may be employed.

A large reflector 90 is pivotally mounted on the platform 20 and has a reflecting surface curving around the transparent enclosure 48, which is positioned on the side of the reflector 90 having the reflecting surface. The reflector 90 includes a parabolic section 92 adjacent each end of transparent enclosure 48, so that the transparent enclosure is approximately at the focal point of each parabolic section 92. The reflector 90 also includes a hinged forward section 94 extending approximately the width of the transparent enclosure 48 and connected by a removable hinge pin 96 to the remainder of the reflector 90 at the forward bottom edge. As can be seen from FIG. 7, the hinged forward section 94 includes a depending web 97 connected to the turntable 16 by a link 98, which is pivotally attached at one end to the web 97 and at the other end to an element secured to the turntable 16. The depending web 97 and the link 98 have been omitted from the other drawing figures for the sake of clarity of illustration.

The reflector 90 comprises a frame made from lightweight structural members 99 such as tubular aluminum members and panels 100 each having a reflecting surface for receiving sunlight and reflecting it toward the fluid receiver 26. The entire reflector 90 is pivotally mounted about a horizontal shaft 102 secured to the forward portion of the platform 20, below the parallel rails 24.

Figure 7:
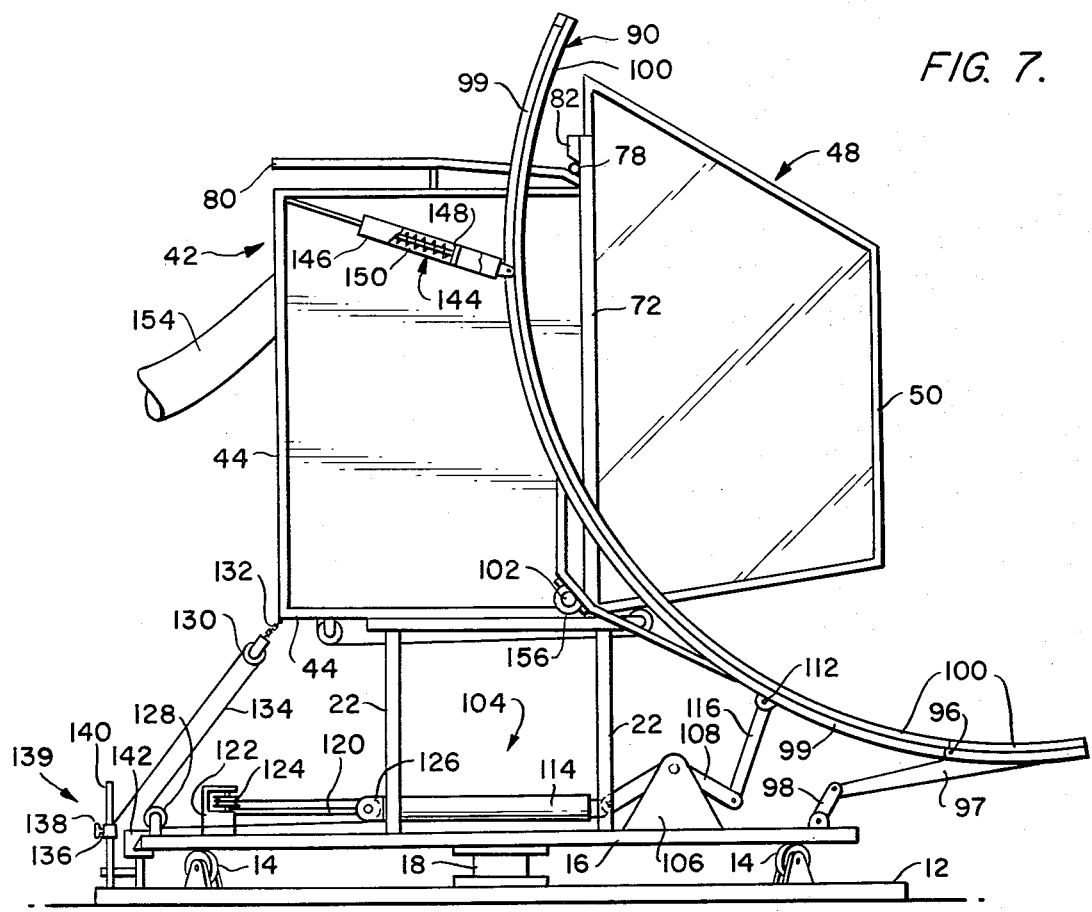
FIG. 7 is a side elevational view of the solar collector assembly, showing the tilting mechanism.

As can be seen from FIG. 7, the reflector 90 is tilted about the horizontal shaft 102 by a tilting mechanism generally designated by the reference numeral 104. Like the web 97 and the link 98, the tilting mechanism 104 has been omitted from the other drawing figures for clarity. The tilting mechanism 104 includes a support member 106 mounted on the turntable 16 for supporting a lever 108. The lever 108 is pivotally mounted at its center to the support member 106, thereby defining a forward lever arm and a rear lever arm. The front end of the forward lever arm is pivotally connected to one end of a link 110 whose other end is pivotally connected to a lower portion of the reflector 90 by an element 112, which is attached to the reflector 90 between the hinge 96 and the horizontal shaft 102.

Figure 8:
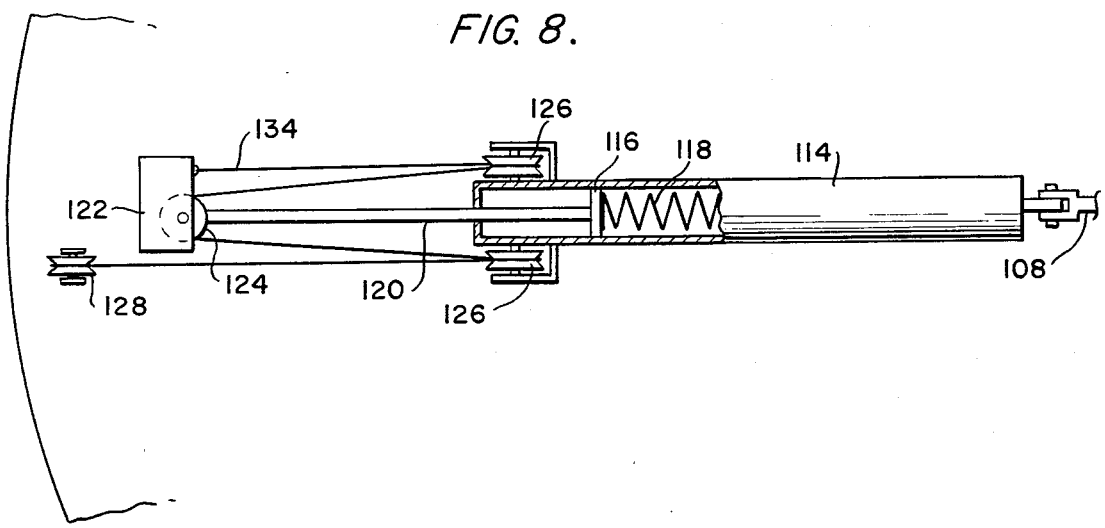
FIG. 8 is a plan view of a portion of the tilting mechanism of FIG. 7.

The rear lever arm of the lever 108 is pivotally connected to the forward end of a horizontally oriented cylinder 114 which contains a piston 116 and a spring 118 which biases the cylinder 114 forward with respect to the piston 116, as can be seen from FIG. 8. The piston 116 is secured to a piston rod 120 which extends through the rear of the cylinder 114 for attachment to an anchor member 122 mounted on the rear of the turntable 16 for rotatably supporting a pulley 124 having a vertical axis. A pair of pulleys 126 having a horizontal axis is mounted on the cylinder 114, one of said pulleys 126 positioned on each side of the cylinder 114 at its rear. Another pulley 128 having a horizontal axis of rotation is mounted at the rear of the turntable 16 adjacent to the anchor member 122, and yet another pulley 130 is suspended by a short length of cable or chain 132 from the insulated compartment 42.

A cable 134 is secured to the anchor member 122 and is fed under the pulley 126 on the side of the cylinder 114 opposite the pulley 128, around the pulley 124, over the other pulley 126 of the pair of pulleys, under the pulley 128 and over the pulley 130. The free end of he cable 134 is secured to a selectively movable element, such as a collar 136 having a thumb screw 138, of a season adjustment mechanism 139 which also includes a stationary element, such as a rod 140, with respect to which the selectively movable element is adjustable. The stationary element is preferably mounted at the rear of the base 12.

With the reflector 90 facing south, the cylinder 114 is in a forward position with respect to the piston 116, and the reflector is tilted back to its greatest extent, as illustrated in FIGS. 7 and 8, so that it will be aimed at the sun when the sun is at its zenith. Rotation of the turntable 16 in either direction away from its south orientation causes the collar 136 to pull on the cable 134, thereby moving the cylinder 114 rearward with respect to the piston 116. The rearward movement of the cylinder 114 forces the rear lever arm of the lever 108 to move up and the forward lever arm to move down, tilting the reflector 90 forward and down. Thus, the reflector 90 is tilted up to its maximum inclination at the center of its arc of rotation about the base 12 and is tilted down to its minimum inclination at the beginning and end of its arc. Thus, in operation, the reflector 90 begins tilted down at one end of its arc to aim at the rising sun. Then, as the reflector 90 is rotated about its arc, it tilts up to a maximum inclination at about noon and tilts back down as it tracks the sun to sunset.

Since the sun will attain greater height in the sky in the summer than in the winter, the season adjustment mechanism permits the reflector 90 to be tilted higher in the summer than in the winter. To move from a winter setting to a summer setting, the selectively movable element of the season adjustment mechanism, such as the collar 136, is moved up along the stationary element, such as the rod 140, and secured there. This movement permits the cylinder 114 move farther forward and the reflector 90 to tilt higher for each angular position of the reflector 90 in its arc.

The turntable 16 can be manually rotated on the base 12 to follow the movement of the sun across the sky. As an alternative, a photoelectric detector can be mounted on the turntable 16 and can be connected to an electrical drive mechanism to rotate the turntable 16 until the reflector 90 is precisely directed toward the sun. Other suitable automatic devices can be utilized. Where the turntable 16 is rotated manually, a caliper brake 142 is mounted on the base 12 and is foot-operated to engage the turntable 16. Furthermore, the release for the brake 142 is also foot-operated.

A pair of stabilizers 144, one of which is shown in FIG. 7, are connected between the frame of the reflector 90 and the frame of the insulated compartment 42 to stabilize the reflector 90 and damp its movements in heavy winds, while permitting relative movement between the reflector 90 and the insulated compartment 42 as the reflector pivots about the horizontal shaft 102. Each stabilizer 144 includes a pneumatic cylinder 146 connected to one frame, a piston 148 connected to the other frame and receivable in the cylinder 146, and a spring 150 mounted in the cylinder 146 and biasing the piston 148 to its fully telescoped position. Thus, the springs 150 assist in pulling the reflector 90 up and back, after it has been pulled down and forward by the cable 134. It can be seen from FIGS. 2–4 that the fluid receiver 26 has outlets and fittings to which hoses 152 may be connected to supply relatively cold water to the fluid receiver and to remove heated water therefrom. The hoses 152 extend through apertures in the bottom insulated panel 46 of the insulated compartment 42 and lead to the point of use. For example, the hoses 152 can be connected to the inlet and outlet of a conventional hot water tank to provide a domestic or commercial supply of hot water. As an alternative, the hoses 152 can be connected directly to an apparatus employing the hot water, such as a clothes washer or dishwasher. In addition, the air in the insulated compartment 42 becomes very hot and dry due to the heated fluid in the receiver 26 when the receiver 26 with its heated fluid is positioned therein and also due to the heat from the sun which flows into the insulated compartment when the insulated door 72 is open. Thus, a flexible conduit 154 can be provided to extend from the thermally insulated compartment 42 to provide a supply of hot, dry air for a number of uses, such as drying clothes. For such a purpose, the conduit 154 can be connected directly to the inlet of a clothes dryer.

The entire solar heating assembly 10 can be disassembled into three parts for relatively easy movement and shipping. The hinged forward section 94 can be removed from the rest of the reflector 90 due to the removable hinge pin 96 and the fact that the pivotal connection of the depending web 97 with the link 98 is removable. The remaining portion of the reflector 90 is removable from the rest of the solar heating assembly 10 due to the mounting of the reflector 90 about the horizontal shaft 102 by brackets 156 (FIG. 7) which are held together by bolts or other removable fasteners. The ability of the solar heating assembly 10 to be disassembled into three parts significantly reduces the overall dimensions of the assembly and its awkwardness for moving and shipping.

Although the foregoing describes certain preferred embodiments of the solar heating assembly according to the present invention, it is understood that various changes and modifications may be made without departing from the spirit and scope of the present invention as recited in the appended claims and their legal equivalents.

What is claimed is:

1. A solar heating assembly, including a solar collector comprising:
a receiver for holding a heat transfer medium,
a reflector having a reflecting surface,
a transparent enclosure mounted on the solar collector on the side of the reflector having the reflecting surface,
an insulated storage compartment mounted on the solar collector, the thermally insulated compartment being in communication with the transparent enclosure,
an insulated door movable from a position permitting communication between the thermally insulated compartment and the transparent enclosure to a position thermally sealing the thermally insulated compartment, and
means for moving the receiver between the thermally insulated compartment and the transparent enclosure.

2. The solar heating assembly of claim 1 further including means for rotating the solar collector to follow the sun.

3. The solar heating assembly of claim 2 wherein the rotating means includes a turntable rotatably mounted to a supporting surface.

4. The solar heating assembly of claim 3 further including means for tilting the reflector about a horizontal axis to follow the rise and fall of the sun.

5. The solar heating assembly of claim 4 wherein the tilting means comprises
a cylinder,
a mechanical linkage connecting the cylinder to the reflector,
a piston slidable in the cylinder, and
means for moving the cylinder with respect to the piston, whereby the mechanical linkage tilts the reflector about a horizontal axis.

6. The solar heating assembly of claim 5 wherein the means for moving the cylinder comprises:
spring means biasing the piston toward one end of the cylinder,
a piston rod connecting the piston to an anchor member mounted on the turntable,
a stationary element mounted on the supporting surface,
pulleys associated with the anchor member and with the cylinder, and
a cable secured with respect to the turntable at one end, guided around the pulleys and connected at its other end to the stationary element, whereby, upon rotation of the turntable, the cable moves the cylinder on the piston against the bias of the spring means and causes the mechanical linkage to tilt the reflector about a horizontal axis.

7. The solar heating assembly of claim 4 further including means, associated with the tilting means, for adjusting the tilt of the reflector for different seasons.

8. The solar heating assembly of claim 6 wherein the cable is connected to the stationary element by a selectively movable element, which, by its movement, adjusts the tilting of the reflector for different seasons.

9. The solar heating assembly of claim 1 wherein the reflector includes at least a pair of parabolic sections having the transparent enclosure in the region of their focal points.

10. The solar heating assembly of claim 1 wherein the insulated door is pivotally mounted between the transparent enclosure and the thermally insulated compartment, and the receiver engages the insulated door, so that, as the receiver moves from the thermally insulated compartment to the transparent enclosure, it causes the insulated door to pivot from the thermally sealing position to the position permitting communication between the thermally insulated compartment and the transparent enclosure.

11. The solar heating assembly of claim 10 wherein spring means are connected to the insulated door to assist the receiver in moving the insulated door to the position permitting communication between the thermally insulated compartment and the transparent enclosure.

12. The solar heating assembly of claim 1 wherein the receiver is positioned on a supporting surface extending from the thermally insulated compartment to the transparent enclosure, and the means for moving the receiver includes roller means connected to the receiver and movable on the supporting surface.

13. The solar heating assembly of claim 12 wherein the supporting surface is sloped upwardly from the thermally insulated compartment to the transparent enclosure.

14. The solar heating assembly of claim 13 wherein the supporting surface comprises parallel rails.

15. The solar heating assembly of claim 1 wherein the solar collector further includes means for retaining the receiver in the transparent enclosure.

16. The solar heating assembly of claim 15 wherein the retaining means includes thermally actuated release means for allowing the receiver to move from the transparent enclosure to the thermally insulated compartment.

17. The solar heating assembly of claim 1 wherein the receiver is connected to the insulated door by a cable for moving the insulated door from the position permitting communication between the thermally insulated compartment and the transparent enclosure to the thermally sealing position as the receiver moves from the transparent enclosure to the thermally insulated compartment.

18. The solar heating assembly of claim 1 further comprising conduits connected to the receiver for supplying and drawing off the heat transfer medium.

19. The solar heating assembly of claim 1 further comprising a conduit connected to the thermally insulated compartment for drawing off heated air from the thermally insulated compartment.

20. The solar heating assembly of claim 1 wherein the reflector includes a forward section pivotally connected to the rest of the reflector.

21. The solar heating assembly of claim 1 further comprising stabilizer means for damping the movement of the reflector.

* * * * *